United States Patent
Nakanishi et al.

(10) Patent No.: US 8,658,228 B2
(45) Date of Patent: Feb. 25, 2014

(54) FUEL CELL MODULE AND FUEL CELL COMPRISING FUEL CELL MODULE

(75) Inventors: Haruyuki Nakanishi, Susono (JP); Shigeaki Murata, Numazu (JP); Masahiro Imanishi, Susono (JP); Yoshihisa Tamura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 838 days.

(21) Appl. No.: 11/883,555

(22) PCT Filed: Feb. 3, 2006

(86) PCT No.: PCT/JP2006/302308
§ 371 (c)(1),
(2), (4) Date: Aug. 31, 2007

(87) PCT Pub. No.: WO2006/083035
PCT Pub. Date: Aug. 10, 2006

(65) Prior Publication Data
US 2008/0152984 A1    Jun. 26, 2008

(30) Foreign Application Priority Data

Feb. 4, 2005    (JP) .................................. 2005-029667

(51) Int. Cl.
*H01M 8/24*    (2006.01)
*H01M 4/64*    (2006.01)

(52) U.S. Cl.
USPC ............................................. 426/66; 429/517

(58) Field of Classification Search
USPC .......... 429/466, 452, 467, 470–471, 507, 517
See application file for complete search history.

(56) References Cited

U.S. PATENT DOCUMENTS

| 4,728,584 A | 3/1988 | Isenberg |
| 6,936,367 B2 * | 8/2005 | Sarkar et al. .................. 429/423 |
| 7,150,932 B1 * | 12/2006 | Hofler et al. .................. 429/463 |
| 2007/0141424 A1 * | 6/2007 | Armstrong et al. ............. 429/32 |

FOREIGN PATENT DOCUMENTS

| EP | 0 264 688 B1 | 7/1991 |
| JP | A 63-110560 | 5/1988 |
| JP | A 63-178459 | 7/1988 |
| JP | A 3-62460 | 3/1991 |
| JP | A 8-162142 | 6/1996 |
| JP | A 11-111314 | 4/1999 |
| JP | 2002539587 | * 11/2002 |
| JP | A 2002-539587 | 11/2002 |

(Continued)

OTHER PUBLICATIONS

Translation of German Office Action dated Jun. 21, 2010 issued in German Patent Application No. 11 2006 000 324.0.

*Primary Examiner* — Ula Corinna Ruddock
*Assistant Examiner* — Thomas H. Parsons
(74) *Attorney, Agent, or Firm* — Oliff PLC

(57) ABSTRACT

A tubular fuel cell module comprising a tubular fuel cell capable of improving current collection efficiency, and a fuel cell comprising the fuel cell module are provided. A fuel cell module (100) includes a plurality of tubular fuel cells (10A, 10A, ...) arranged in parallel and a first current collector (35), wherein the tubular fuel cells (10A, 10A, ...) are woven by the first current collector (35) in a direction crossing an axial direction of the tubular fuel cells (10A, 10A, ...) in a plan view.

4 Claims, 8 Drawing Sheets

(56) References Cited

FOREIGN PATENT DOCUMENTS

| JP | A 2003-282072 | 10/2003 |
| JP | A 2004-505417 | 2/2004 |
| JP | A 2004-288542 | 10/2004 |
| JP | A 2004-335277 | 11/2004 |
| WO | WO01/24300 * | 4/2000 |
| WO | WO 02/09212 A1 | 1/2002 |

* cited by examiner (A)

FUEL CELL MODULE AND FUEL CELL COMPRISING FUEL CELL MODULE

TECHNICAL FIELD

The present invention relates to a fuel cell module comprising tubular fuel cells and a fuel cell comprising the fuel cell module. More specifically, the present invention relates to a fuel cell module comprising tubular fuel cells and capable of improving a current collection efficiency and a fuel cell comprising the fuel cell module.

BACKGROUND ART

In a conventional solid polymer electrolyte fuel cell (hereinafter, referred to as "PEFC"), electric energy generated by an electrochemical reaction produced in a membrane electrode assembly (hereinafter, referred to as "MEA") that comprising a plate electrolyte membrane and electrodes (a cathode and an anode) arranged on both sides of the electrolyte membrane, respectively is extracted to an outside of the PEFC via separators arranged on both sides of the MEA. This PEFC can be actuated in a low temperature region and is generally used at an operation temperature of about 80° C. to 100° C. Furthermore, because of high energy conversion efficiency of 30% to 40%, short start-up time, and small-sized and lightweight system, the PEFC is expected as an optimum power source of a battery car or a portable power supply.

Meanwhile, a unit cell of a conventional PEFC comprises such constituent elements as an electrolyte membrane, a cathode and an anode each comprising a catalyst layer, and a separator, and its theoretical electromotive force is 1.23 volts. Such a low electromotive force is insufficient as a power source of the battery car or the like. Due to this, a stack fuel cell configured by arranging end plates or the like on both ends of a laminated body, in which unit cells are laminated in series in a lamination direction, is normally used as a power source. It is, however, preferable to downsize a unit cell and to increase an electric-power generating reaction area (output density) per unit area so as to further improve electric power generation efficiency of the PEFC (hereinafter, sometimes simply referred to as "fuel cell").

In order to increase the output density of the conventional plate fuel cell (hereinafter, sometimes referred to as "plate FC") per unit area and to improve the electric power generation efficiency thereof, it is necessary to thin the above constituent elements of the plate FC. However, if thicknesses of the constituent elements of the plate FC are set to be equal to or smaller than predetermined thicknesses, functions, strengths and the like of the respective constituent elements may possibly be lowered. For this reason, it is structurally difficult to increase the output density of the fuel cell configured as stated above per unit area to be equal to or higher than a certain density.

From these viewpoints, studies about a tubular fuel cell (hereinafter, sometimes referred to as "tubular FC") have been recently conducted. A unit cell of the tubular FC comprises a hollow-shaped MEA (hereinafter, simply referred to as "hollow MEA") that comprises a hollow electrolyte layer and hollow electrode layers arranged inside and outside of the hollow electrolyte layer, respectively. An electrochemical reaction is produced by supplying reaction gases (a hydrogen-based gas and an oxygen-based gas) to the inside and outside of the hollow MEA, respectively, and electric energy generated by the electrochemical reaction is extracted to the outside via current collectors arranged inside and outside of the hollow MEA. Namely, the tubular FC facilitates extracting the electric energy by supplying one of the reaction gases (the hydrogen-based gas or oxygen-based gas) to the inside of the hollow MEA comprised in each tubular FC cell and the other reaction gas (the oxygen-based gas or hydrogen-based gas) to the outside of the hollow MEA. As can be seen, by supplying the same reaction gas to outside surfaces of two adjacent tubular FC cells in the tubular FC, it is possible to dispense with separators that have gas shielding performance in the conventional plate FC. Accordingly, the tubular FC efficiently enables downsizing of the unit cells.

On the other hand, to further improve the power generation performance of the tubular FC, it is preferable to improve efficiency (current correction efficiency) for extracting the electric energy generated in each of the tubular FC cells to the outside. Such improvement in the current collection efficiency can be attained by such means as one for contacting a current collector with a plurality of tubular FC cells.

Several techniques intended to improve the current collection efficiency of the tubular FC have been disclosed so far. For example, Japanese Patent Application Laid-Open (JP-A) No. 2004-288542 discloses a technique relating to a fuel cell system that comprises a cell assembly formed by connecting a plurality of tubular FC cells to one another via cell-connection conductor members and an electrode-connection conductor member electrically connected to the cell assembly. With the technique disclosed therein, the connection between the cell-connection conductor members and the electrode-connection conductor member each comprising a current collecting capability is maintained, so that a fuel cell having a stable electric power generation performance can be provided. Furthermore, JP-A No. 8-162142 discloses a technique relating to a solid PEFC comprising a plurality of tubular FC cells and a baffle. With the technique disclosed therein, a solid PEFC having an improved electric power generation performance can be provided.

However, the technique disclosed in JP-A No. 2004-288542 has the following problem. Since the cell assembly can be connected to the electrode-connection conductor member via the cell-connection conductor members and the respective tubular FC cells, connection resistance is possibly increased and current collection efficiency is possibly deteriorated. Further, the technique disclosed in JP-A No. 8-162142 has the problem that the current collection efficiency is difficult to improve.

It is, therefore, an object of the present invention to provide a fuel cell module comprising a tubular fuel cell and capable of improving current collection efficiency and a fuel cell comprising the fuel cell module.

DISCLOSURE OF THE INVENTION

To solve the problems, the present invention takes the following measures. Namely, according to a first aspect of the present invention, there is provided a fuel cell module comprising: a plurality of tubular fuel cells arranged in parallel; and a first current collector, wherein the plurality of tubular fuel cells is woven by the first current collector in a direction crossing an axial direction of the tubular fuel cells in a plan view so that the plurality of tubular fuel cells are integrally fixed by the first current collector.

Here, "arranged in parallel" means that axial directions of a plurality of tubular fuel cells are parallel to one another and that the respective tubular fuel cells are arranged in a direction almost perpendicular to the axial direction. If a plurality of tubular fuel cells is arranged in parallel, a layered tubular fuel cell assembly (hereinafter, also referred to as "FC cell layer") can be formed. The number of tubular fuel cells is not limited to a specific number as long as the number is two or more, and an appropriate number of tubular fuel cells can be formed in view of the output density, the productivity and the like of the fuel cell module. The "first current collector" means a crossing-direction current collector that can collect charges in the crossing direction of the tubular fuel cells. Further, "woven . . . in a direction crossing an axial direction of the tubular fuel cells in a plan view so that the plurality of tubular fuel cells are integrally fixed by the first current collector" means that a plurality of tubular fuel cells can be integrally fixed by the first current collector by spreading the first current collector in the crossing direction of the tubular fuel cells arranged in parallel.

In the first aspect of the present invention, the fuel cell module may further comprise a second current collector arranged in parallel to the plurality of tubular fuel cells, wherein the plurality of tubular fuel cells and the second current collector may be woven by the first current collector in the direction crossing the axial direction of the tubular fuel cells in the plan view.

Here, "the plurality of tubular fuel cells and the second current collector are woven by the first current collector in the direction crossing the axial direction of the tubular fuel cells in the plan view" means that the second current collector and a plurality of tubular fuel cells can be integrally fixed by the first current collector by spreading the first current collector in the crossing direction of the second current collector and the tubular fuel cells arranged in parallel. The number of the second current collectors provided according to the first aspect of the present invention is not limited to a specific one, and an appropriate number of second current collectors can be formed in view of the current collection efficiency, the productivity and the like. In the first aspect of the present invention, specific example of the second current collector can include an axial-direction current collector.

In the first aspect of the present invention, (including modifications. It is the same in the following) the second current collector may be arranged on an end of an array of the plurality of tubular fuel cells.

In the first aspect of the present invention, the second current collector may be arranged in parallel to and alternately with the plurality of tubular fuel cells.

Here, "arranged in parallel to and alternately with" means a configuration in which the second current collector is arranged between the plurality of tubular fuel cells.

In the first aspect of the present invention, the first current collector may be gas-permeable.

Here, "gas-permeable" means that the first current collector is configured so as to be able to permeate gas in a direction of, for example, penetrating the first current collector (e.g., a thickness direction of the FC cell layer). Examples of the gas-permeable first current collector can include a first current collector formed by a conductive porous member.

In the first aspect of the present invention, the fuel cell module may further comprise a third current collector in contact with the first current collector, and the plurality of tubular fuel cells and the second current collector woven by the first current collector and the third current collector may be alternately laminated.

In the first aspect of the present invention, the third current collector may be a gridiron or lattice flat plate.

Here, "gridiron" means a form having a plurality of through-holes formed in parallel to one direction, and "lattice" means a form having a plurality of through-holes formed in two directions crossing each other. The "through-holes" means openings formed to penetrate the thickness direction of the third current collector. In the first aspect of the present invention, the number of through-holes that can be formed is not limited to a specific one, and an appropriate number of through-holes can be formed in view of the current collection efficiency, the productivity of the third current collector and the like. Besides, a form of the through-hole is not limited to a specific one, and through-holes in an appropriate form such as a square hole, a rectangular hole or an elliptical hole can be formed in view of the current collection efficiency, the productivity and the like. To improve the current collection efficiency, it is preferable that the first current collector, the second current collector, and the third current collector are integrated with one another. Specific examples of the integrated configuration can include a configuration in which the tubular FC cells, the second current collector, and the third current collector are bonded together by the first current collector.

According to a second aspect of the present invention, there is provided a fuel cell comprising the fuel cell module according to the first aspect of the present invention.

Effect of the Invention

According to the first aspect of the present invention, a plurality of tubular fuel cells is woven by the first current collector. Due to this, it is possible to effectively collect current in the crossing direction via the first current collector. Therefore, by so configuring, it is possible to provide a fuel cell module capable of improving the current collection efficiency.

In the first aspect of the present invention, if the second current collector and a plurality of tubular fuel cells are woven by the first current collector and the first current collector contacts with the second current collector, charges collected in the crossing direction via the first current collector can be transmitted in the axial direction via the second current collector. Therefore, by so configuring, it is possible to provide a fuel cell module capable of improving the current collection efficiency.

In the first aspect of the present invention, if the second current collector is arranged on an end of an array of the plurality of tubular fuel cells, it is possible to suppress an increase in the number of constituent elements of the fuel cell module. Therefore, in addition to the above advantages, the productivity of the fuel cell module can be advantageously improved.

In the first aspect of the present invention, if the second current collector and the plurality of tubular fuel cells arranged in parallel to and alternately with each other are woven by the first current collector, it is possible to improve the current collection efficiency by improving efficiency for transmitting charges in the axial direction.

Moreover, in the first aspect of the present invention, if the fuel cell module comprises a gas-permeable first current collector, gas diffusion property can be improved.

Furthermore, in the first aspect of the present invention, if the tubular fuel cells and the second current collector integrally fixed by the first current collector and the third current collector are alternately laminated, it is possible to further improve the current collection efficiency by collecting current via the third current collector.

Further, in the first aspect of the present invention, if a through-hole is formed in the third current collector, it is possible to collect current in the crossing direction via the first current collector and a frame of the through-hole and to facilitate improving the current collection efficiency in the crossing direction.

According to the second aspect of the present invention, the fuel cell comprises the fuel cell module capable of improving the current collection efficiency. Therefore, it is possible to provide a fuel cell capable of improving the electric power generation performance by improving the current collecting performance.

Figure 1:
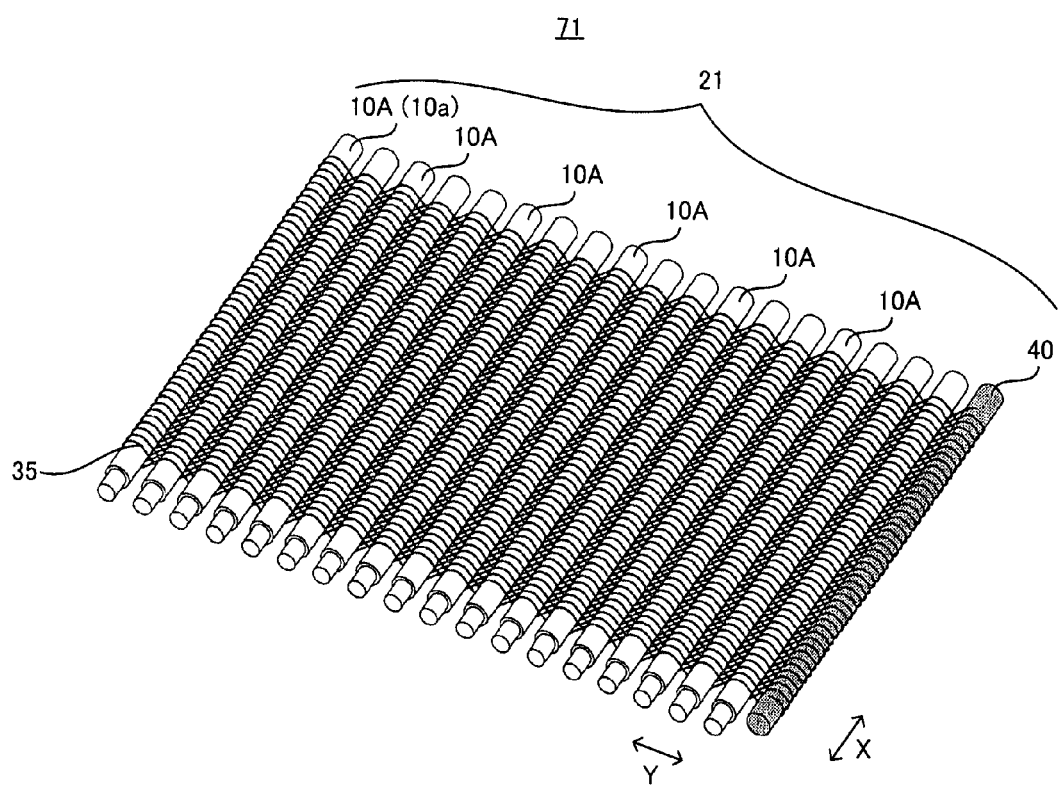
FIG. 1 is an external view schematically showing tubular FC cells and first and second current collectors comprised in a fuel cell module according to a first embodiment of the present invention.

In the accompanying drawings, reference numeral 10 denotes a tubular fuel cell ("tubular FC cell"), 30 denotes a third current collector, 31 denotes a through-hole, 32 denotes a third current collector, 33 denotes a through-hole, 35 denotes a first current collector, 40 denotes a second current collector, 41 denotes a second current collector, 100 denotes a fuel cell module, and 1000 denotes a fuel cell.

BEST MODE FOR CARRYING OUT THE INVENTION

Studies about a tubular FC have been conducted with a view of, for example, increasing an output density thereof per unit volume. To further increase the output density of the tubular FC, it is preferable to increase a packing density of tubular FC cells comprised in the tubular FC. On the other hand, even if the packing density of the tubular FC cells are increased, it is difficult to efficiently increase the output density of the tubular FC when efficiency for collecting charges (collecting currents) generated in the respective tubular FC cells is low. It is, therefore, preferable to provide a tubular FC capable of efficiently increasing the output density by improving the current collection efficiency.

The present invention has been made from these viewpoints. A first aspect of the present invention is to provide a fuel cell module capable of improving the current collection efficiency by being configured to comprise a plurality of tubular FC cells arranged in parallel and a current collector in contact with the tubular FC cells. A second aspect of the present invention is to provide a fuel cell capable of improving the current collection efficiency by being configured to comprise the fuel cell module.

To facilitate understanding the present invention, a tubular FC cell, a fuel cell module comprising the tubular FC cell, and a fuel cell comprising the fuel cell module will first be described.

Figure 8:
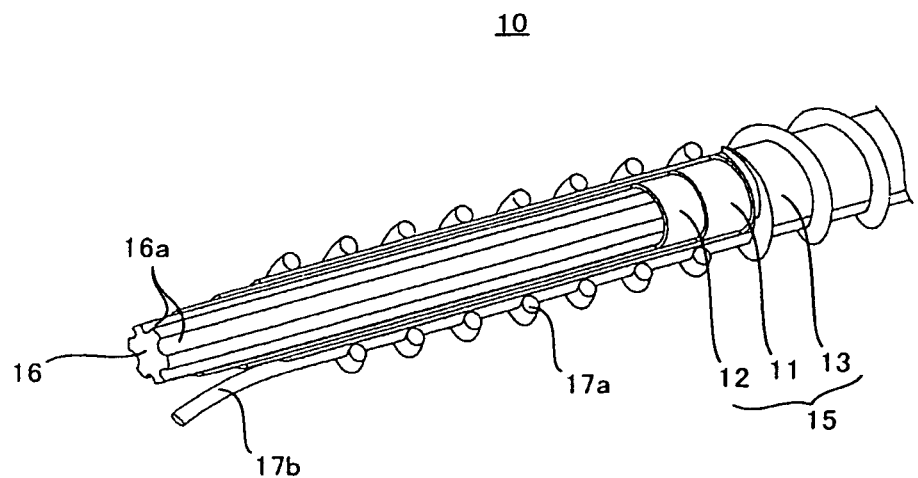
FIG. 8 is an external view schematically showing a conventional tubular FC cell and a conventional fuel cell module comprising the tubular FC cells.
Figure 8:
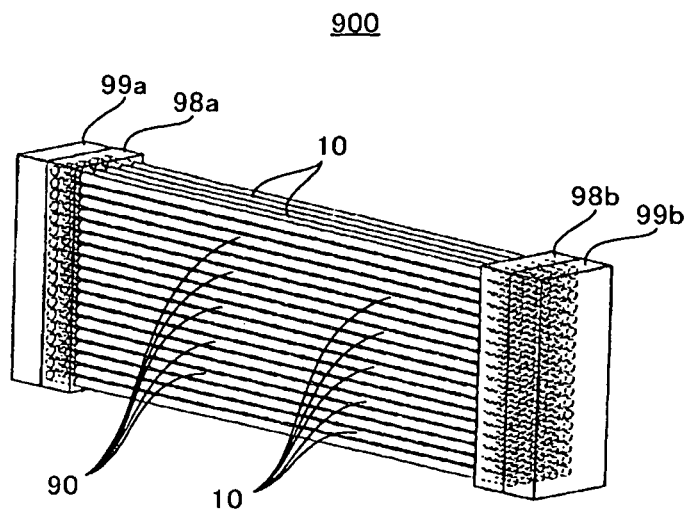

FIG. 8 is an external view schematically showing a conventional tubular FC cell and a conventional fuel cell module comprising the tubular FC cells. To help understand an internal structure of the tubular FC, FIG. 8 shows constituent elements of the tubular FC appropriately in a cutaway.

As shown in FIG. 8(A), a conventional tubular FC cell 10 comprises an MEA 15 that comprises a hollow electrolyte membrane (e.g., a fluorine-based ion exchange resin membrane such as Nafion, a registered trademark of E. I. du Pont de Nemours and Company) 11, a hollow anode catalyst layer 12 and a hollow cathode catalyst layer 13 arranged inside and outside of the electrolyte membrane 11, respectively, an anode current collector 16 arranged so that an outer circumferential surface of the anode current collector 16 contacts with an inner circumferential surface of the anode catalyst layer 12, and cathode current collectors 17a and 17b arranged to contact with an outer circumferential surface of the hollow cathode catalyst layer 13. In the tubular FC cell 10 shown therein, reaction gas passages 16a, 16a, . . . in which a hydrogen-based gas (hereinafter, referred to as "hydrogen") to be supplied to the anode catalyst layer 12 flows are formed on the outer circumferential surface of the anode current collector 16 (which surface contacts with the anode catalyst layer 12). On the other hand, an oxygen-based gas (hereinafter, referred to as "air") can be directly supplied to outer circumferential surfaces of the tubular FC cells 10 (cathode catalyst layer 13) by blowing the air against the outer circumferential surfaces from the outside. Each of the anode catalyst layer 12 and the cathode catalyst layer 13 shown in FIG. 8(A) contains, for example, platinum or the like acting as a catalyst in the electrochemical reaction and a proton-conducting matter such as a fluorine-based ion exchange resin.

The tubular FC cell 10 is configured as stated above. Due to this, if the tubular FC cells 10, 10, . . . thus configured are arranged (see FIG. 8(B)), oxygen can be supplied to the cathode catalyst layers 13, 13, . . . of the respective tubular FC cells 10, 10, . . . by supplying the air from the outside. Namely, the tubular FC cells 10 can be configured without need to provide separators that shield the tubular FC cells 10 from one another and a diffusion layer for effectively supplying oxygen to the cathode catalyst layers 13 of the respective tubular FC cells 10. The number of constituent elements of each cell can be thereby decreased. According to the tubular FC cell 10, therefore, a unit cell can be effectively downsized.

FIG. 8(B) is an external view schematically showing a fuel cell module comprising the plurality of tubular FC cells and cooling tubes to cool the tubular FC cells. As shown in FIG. 8(B), a fuel cell module 900 comprises a plurality of tubular FC cells 10, 10, . . . and a plurality of cooling tubes 90, 90, . . . . Gas manifolds 98a and 98b to which hydrogen supplied to the reaction gas passages 16a, 16a, . . . of the tubular FC cells 10 is to be fed, and cooling water manifolds 99a and 99b to which water supplied into the cooling tubes is to be fed are provided on both ends of the fuel cell module 900, respectively. Further, a current collector (not shown) collecting charges generated in the respective tubular FC cells 10, 10, . . . is provided. The hydrogen supplied to the fuel cell module 900 via one of the gas manifolds (e.g., 98a) is passed through the reaction gas channels 16a, 16a, . . . of the tubular FC cells 10, 10, . . . and used for the electrochemical reaction in the tubular FC cells 10, 10, . . . . The hydrogen or the like that is not used for the electrochemical reaction is collected via the other gas manifold (e.g., 98b). In the fuel cell module 900, one end of the current collector is connected to the anode current collectors 16, 16, . . . of the tubular FC cells 10, 10, . . . and the other end thereof is connected to the cathode current collectors 17a and 17b of the tubular FC cells 10, 10, . . . , whereby the current collector collects charges (collects currents) generated in a plurality of tubular FC cells 10, 10, . . . .

With a view of, for example, improving the current collection efficiency, the cathode collectors 17a and 17b are provided on the outer circumferential surface of each tubular FC cell 10 (see FIG. 8(A)), the cathode collector 17a functions as a crossing-direction current collector, and the cathode collector 17b functions as an axial-direction current collector in the conventional tubular FC cell 10. With the configuration, however, it is necessary to take procedures such as a procedure of extracting the charges collected in the crossing direction via the axial-direction current collector 17b. As a result, a current collection path to extract the charges to the outside becomes long, which tends to deteriorate the current collection efficiency due to the resistance or the like of the current collector. Considering these, the present invention provides a fuel cell module capable of improving the current collection efficiency by contacting a plurality of tubular FC cells with a current collector to thereby improve the current collection efficiency in the crossing direction, and a fuel cell comprising the fuel cell module.

Referring to the drawings, a fuel cell module and a fuel cell comprising the fuel cell module according to the present invention will be specifically described below.

FIG. 1 is an external view schematically showing a plurality of tubular FC cells and first and second current collectors comprised in a fuel cell module according to a first embodiment of the present invention. In FIG. 1, constituent elements similar in configuration to those shown in FIG. 8 are denoted by the same reference numerals as those used to denote the respective constituent elements shown in FIG. 8, and will not be described appropriately. In FIG. 1, an arrow X indicates an axial direction and an arrow Y indicates a crossing direction.

As shown therein, a plurality of tubular FC cells 10A, 10A, . . . and a second current collector 40 according to the first embodiment are arranged in parallel, thereby forming an FC cell layer 21. The FC cell layer 21 is woven by a first current collector 35 in a fibrous or tubular form or the like in the crossing direction almost orthogonal to the axial direction, thereby forming a fuel cell assembly 71.

It is to be noted that each of the tubular FC cells 10A, 10A, . . . shown in FIG. 1 does not comprise the crossing-direction current collector 17a and the axial-direction current collector 17b (see FIG. 8). In the description of the first embodiment, a length of the first current collector 35 necessary to reach from the second current collector 40 to a tubular FC cell 10a on an end via a plurality of tubular FC cells 10A, 10A, . . . is L.

In the first embodiment, the first current collector 35 starting at, for example, an upper side surface of the second current collector 40 arranged on an end of the FC cell layer 21 and passing through a lower side surface of the tubular FC cell 10A adjacent to the second current collector 40 reaches the tubular FC cell 10a arranged on the end by repeatedly passing through the upper side surface of the tubular FC cell 10A arranged next to the former tubular FC cell 10A and alternately passing through the lower side surface and the upper side surface. The first current collector 35 reaching the tubular FC cell 10a on the end reaches the second current collector 40 via the outer circumferential surface of the tubular FC cell 10a with the same stroke as that stated above. Thereafter, the same stroke is made repeatedly, thereby forming the fuel cell assembly 71. Therefore, according to the first embodiment, the first current collector 35 contacts with outer circumferential surfaces of the respective tubular FC cells 10A, 10A, . . . , so that the first current collector 35 can assume the function of the conventional crossing-direction current collector. Furthermore, the second current collector 40 arranged in parallel to a plurality of tubular FC cells 10A, 10A, . . . can assume the function of the conventional axial-direction current collector. The first current collector 35 contacts with the second current collector 40 acting as the axial-direction current collector at about 2 L length's intervals. Therefore, by so configuring, the charges generated in the tubular FC cells 10A, 10A, . . . can be easily collected into the second current collector 40 via the first current collector 35. Namely, according to the first embodiment, by employing the crossing-direction current collector 35 in contact with the axial-direction current collector at about 2 L length's intervals and the axial-direction current collector 40, it is possible to reduce a length of a current collection path as compared with the conventional technique. It is thereby possible to reduce polarization resulting from a specific resistance of the current collector and to improve the current collection efficiency of the fuel cell assembly 71. By configuring the fuel cell module to comprise the fuel cell assembly 71 thus configured, it is possible to improve the current collection efficiency of the fuel cell module.

Moreover, according to the first embodiment, a plurality of tubular FC cells 10A, 10A, . . . and the second current collector 40 constituting the FC cell layer 21 are woven altogether by the first current collector 35. Due to this, as compared with the conventional fuel cell module required to execute a step of arranging the crossing-direction current collector on the outer circumferential surfaces of the respective tubular FC cells 10A, 10A, . . . , productivity of the fuel cell module can be improved.

Figure 2:
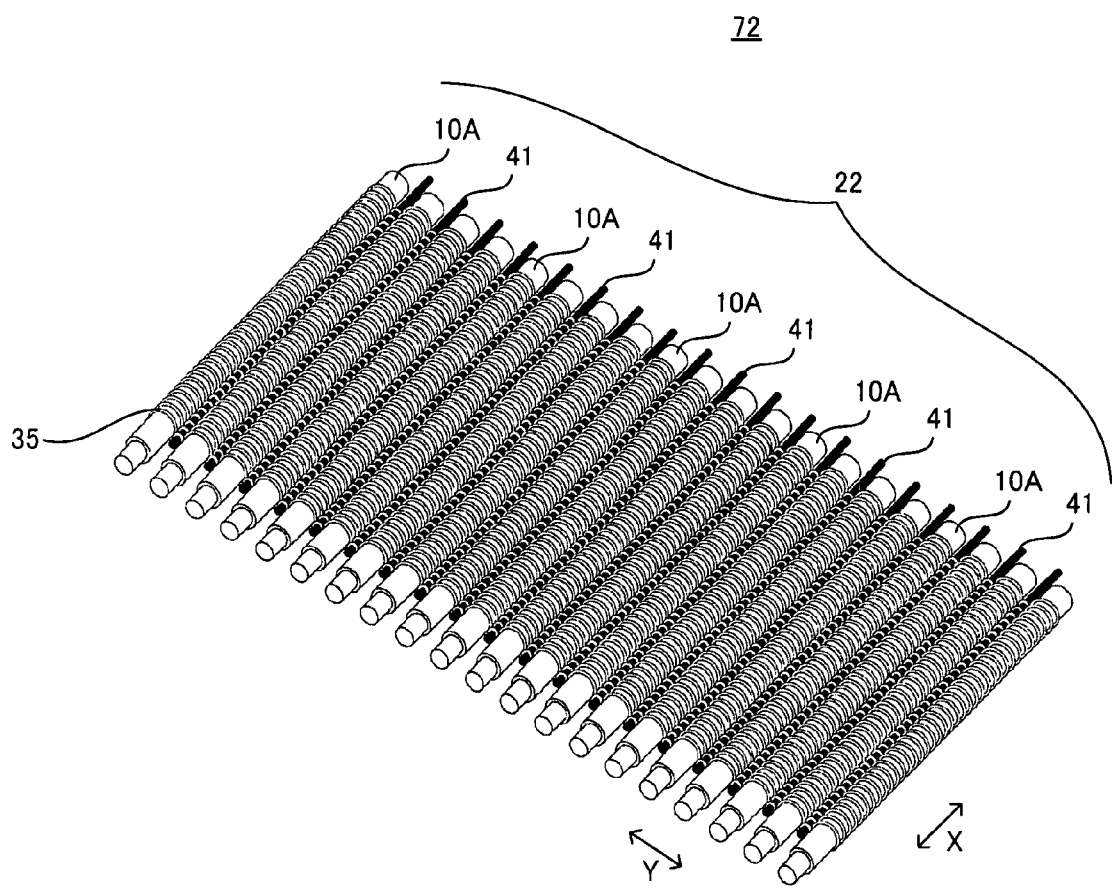
FIG. 2 is an external view schematically showing tubular FC cells and first and second current collectors comprised in a fuel cell module according to a second embodiment of the present invention.

FIG. 2 is an external view schematically showing a plurality of tubular FC cells and first and second current collectors comprised in a fuel cell module according to a second embodiment of the present invention. In FIG. 2, constituent elements similar in configuration to those shown in FIG. 1 are denoted by the same reference numerals as those used to denote the respective constituent elements shown in FIG. 1, and will not be described appropriately. In FIG. 2, an arrow X indicates an axial direction and an arrow Y indicates a crossing direction.

As shown therein, a plurality of tubular FC cells 10A, 10A, . . . and a plurality of second current collectors 41, 41, . . . are arranged in parallel and alternately, thereby forming an FC cell layer 22. Similarly to the fuel cell assembly 71 according to the first embodiment, the FC cell layer 22 is woven by the first current collector 35 in the crossing direction, thereby forming a fuel cell assembly 72.

In the second embodiment, a plurality of tubular FC cells 10A, 10A, . . . and a plurality of second current collectors 41, 41, . . . are arranged alternately. Due to this, the current collection efficiency in the axial direction can be improved as compared with the fuel cell assembly 71 according to the first embodiment. Accordingly, with the configuration shown in FIG. 2, the current collection efficiency of the fuel cell module can be improved similarly to the configuration shown in FIG. 1. Similarly to the first embodiment, the fuel cell assembly 72 according to the second embodiment is formed by causing the tubular FC cells 10A, 10A, . . . and the second current collectors 41, 41, . . . constituting the FC cell layer 22 to be woven altogether by the first current collector 35. Therefore, it is possible to provide that as compared with the conventional fuel cell module, productivity of the fuel cell module thus configured can be improved.

In the first embodiment and the second embodiment, the configuration in which the tubular FC cells 10A, 10A, ... and the second current collector 40 (or current collectors 41, 41, ... ) are woven by the first current collector 35 in the crossing direction almost orthogonal to the axial direction has been described. However, a weaving direction of the first current collector 35 according to the first and second embodiment is not limited to the crossing direction but may be any other direction as long as the direction crosses the axial direction.

Moreover, a material that can constitute the first and second current collectors according to the first and second embodiments is not limited to a specific one as long as the material has high conductivity. Nevertheless, with a view of improving the current collecting performance, the material is preferably a gas-permeable material in the lamination direction of the FC cell layer or the like. Specific examples of the material include not only stainless steel, Ti, Pt, Au, TiC, $TiSi_2$, $SiO_2$, $B_2O_3$, $Nd_2O$, and $TiB_2$ but also carbon-based materials.

Figure 3:
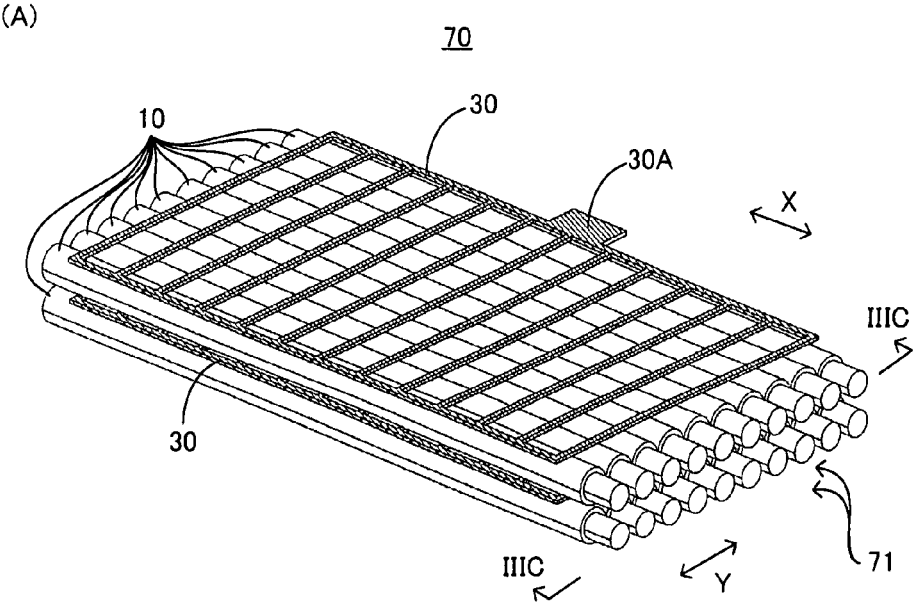
FIG. 3 is an external view schematically showing a fuel cell assembly and a third current collector comprised in a fuel cell module according to a third embodiment of the present invention.
Figure 3:
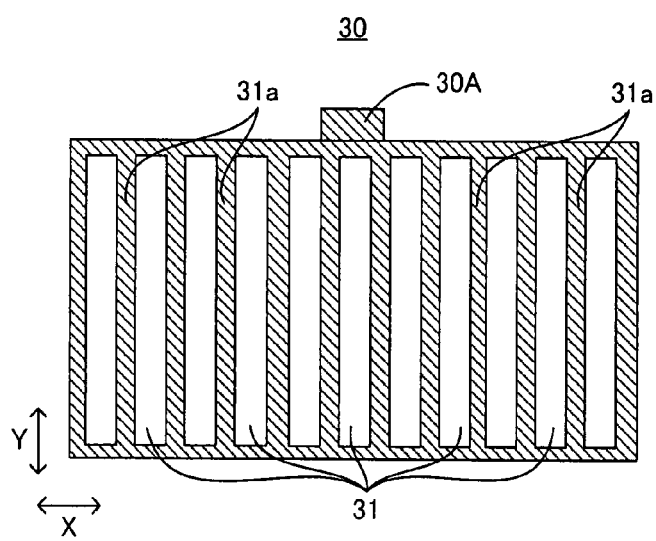
Figure 3:
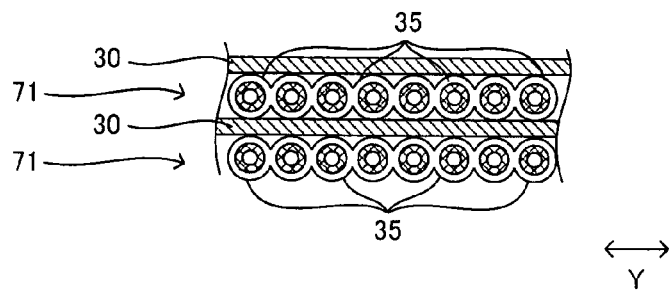

FIG. 3 is an external view schematically showing fuel cell assembly and a third current collector comprised in a fuel cell module according to a third embodiment of the present invention. FIG. 3(A) is an external view schematically showing a part of a plurality of fuel cell assemblies and a plurality of third current collectors comprised in the fuel cell module according to the third embodiment. FIG. 3(B) is a front view schematically showing the third current collector according to the third embodiment, and FIG. 3(C) a schematically partially cross-sectional view taken along an arrow shown in FIG. 3(A). In FIG. 3(A), the first current collector and the second current collector comprised in each of the fuel cell assemblies are not shown. In FIG. 3(C), the second current collector in each of the fuel cell assemblies is not shown. However, it is assumed that each fuel cell assembly actually comprises these current collectors. In FIG. 3, constituent elements similar in configuration to those shown in FIG. 1 and/or FIG. 8 are denoted by the same reference numerals as those used to denote the respective constituent elements shown in FIG. 1 and/or FIG. 8, and will not be described appropriately. In FIG. 3, an arrow X indicates an axial direction and an arrow Y indicates a crossing direction.

As shown in FIG. 3(A), a fuel cell assembly 70 according to the third embodiment is formed by alternately laminating fuel cell assemblies 71, 71 and gridiron third current collectors 30, 30. Each of the third current collectors 30, 30 comprises a plurality of through-holes 31, 31, ... formed into slits (see FIG. 3(B)). As shown in FIG. 3(B), the through-holes 31, 31, ... formed in each of the third current collectors 30 are formed via frames 31a, 31a, ... in the crossing direction, respectively. As shown in FIG. 3(C), each of the third current collectors 30, 30 according to the third embodiment contacts with the first current collectors 35, 35, ... arranged on the outer circumferential surfaces of the respective tubular FC cells 10, 10, .... Due to this, charges collected via the first current collectors 35, 35, ... can be extracted to the outside via the third current collectors 30, 30. Accordingly, by configuring the fuel cell module to include the fuel cell assemblies 70 shown in FIG. 3, the current collection efficiency of the fuel cell module can be improved. As shown in FIGS. 3(A) and 3(B), the third current collector 30 comprises a tab 30A arranged in an axially central portion of the third current collector 30 so as to, for example, be able to easily extract the collected charges to the outside.

Moreover, the fuel cell assembly 70 shown therein can be easily manufactured because it is formed by alternately laminating the fuel cell assemblies 71, 71 and the third current collectors 30, 30.

Figure 4:
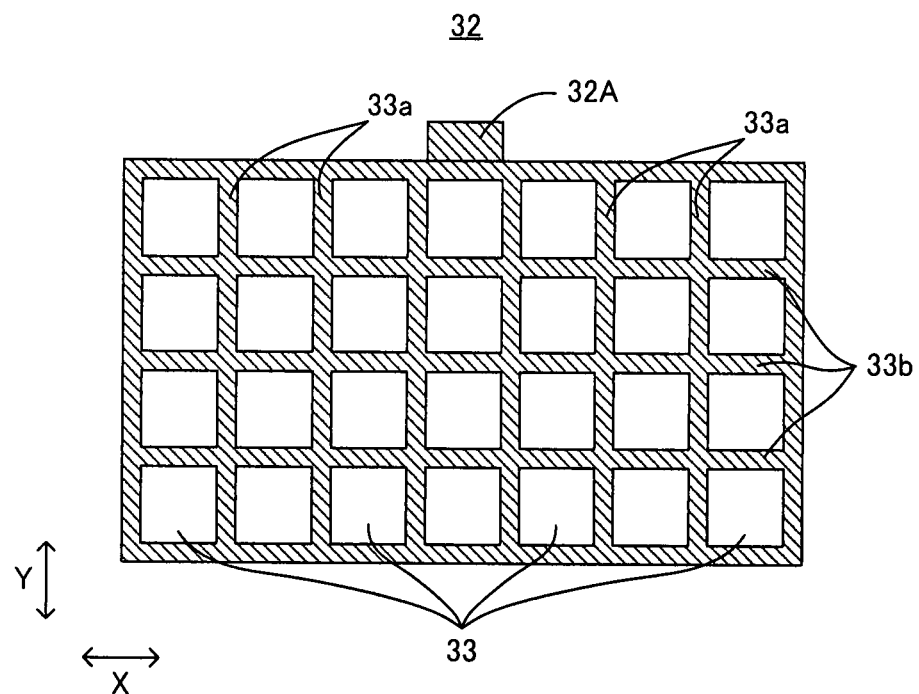
FIG. 4 is a front view schematically showing an example of a configuration of the third current collector according to the third embodiment.

In the third embodiment, the configuration in which the tab 30A is arranged in the axially central portion of the third current collector 30 has been described. However, a position at which the tab 30A can be provided is not limited to a specific position. Moreover, the gridiron third current collector 30 in which the slit-like through-holes are formed has been described. However, a shape of the third current collector 30 is not limited to the gridiron shape. For example, the through-holes may be formed into lattices. FIG. 4 schematically shows a third current collector including lattice through-holes.

FIG. 4 is a front view schematically showing an example of the configuration of the third current collector. As shown therein, a third current collector 32 comprises a plurality of lattice through-holes 33, 33, .... The through-holes 33, 33, ... are formed via frames 33a, 33a, ... in the crossing direction and frames 33b, 33b, ... in the axial direction, respectively. By so configuring the third current collector 32, the third current collector 32 can also assume the function of collecting charges in the axial direction. It is thereby possible to further improve the current collection efficiency. As shown in FIG. 4, the third current collector 32 has a tab 32A arranged in an axially central portion of the third current collector 32.

In the third embodiment, the configuration in which the through-holes formed via the frames in the crossing direction almost orthogonal to the axial direction are provided in the third current collector has been described. However, the configuration of the third current collector is not limited to that stated above. It suffices that the through-holes are formed via the frames in a direction crossing the axial direction. Nevertheless, it is preferable that the third current collector comprises the frames in the crossing direction almost orthogonal to the axial direction with a view of effectively improving the current collection efficiency in the crossing direction. Moreover, in the third embodiment, the third current collector comprising the through-holes has been described. However, the third current collectors laminated alternately with the fuel cell assemblies do not necessarily comprise through-holes. Even if the third current collectors do not include the through-holes, the third collectors can contact with a plurality of tubular FCs in the direction crossing the axial direction. Due to this, as compared with the conventional technique, the current collection efficiency in the crossing direction can be improved.

Furthermore, a constituent material of the third current collector according to the third embodiment is not limited to a specific material as long as the material has high conductivity. Nevertheless, with a view of improving the current collecting performance, the material is preferably a gas-permeable material in the lamination direction of the FC cell layer or the like. Specific examples of the material include not only stainless steel, Ti, Pt, Au, TiC, $TiSi_2$, $SiO_2$, $B_2O_3$, $Nd_2O$, and $TiB_2$ but also carbon-based materials.

Figure 5:
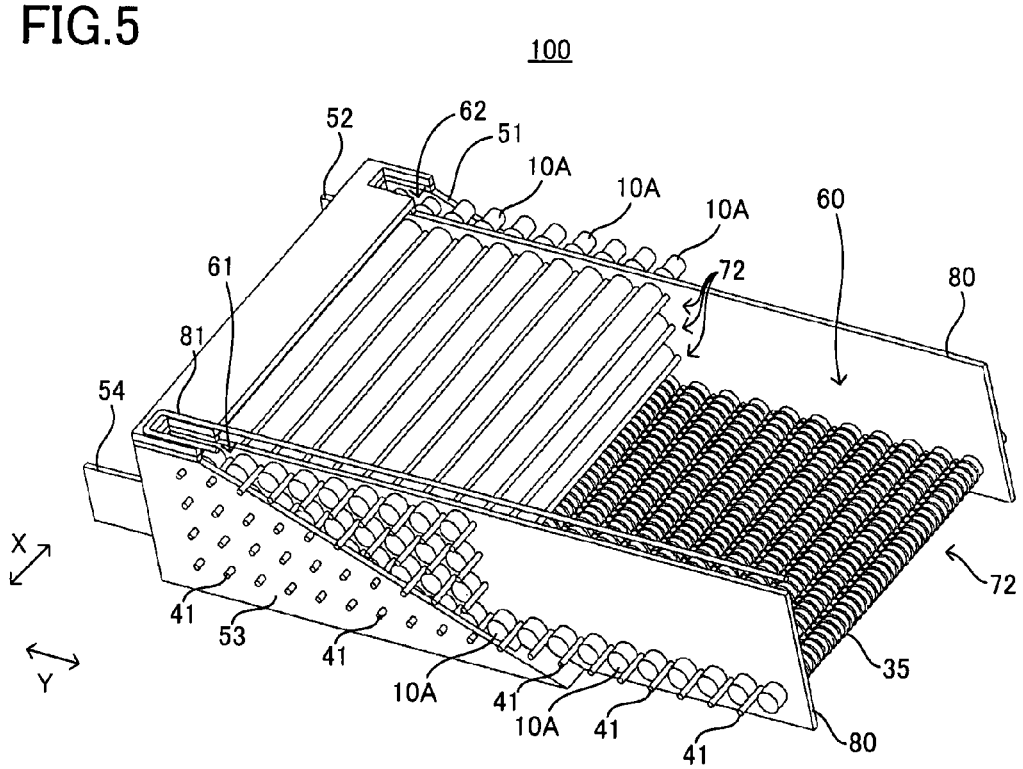
FIG. 5 is an external view schematically showing the fuel cell module according to the present invention comprising fuel cell assemblies according to the second embodiment.

FIG. 5 is an external view schematically showing a fuel cell module according to the present invention comprising the fuel cell assemblies 72 according to the second embodiment. In FIG. 5, constituent elements similar in configuration to those shown in FIG. 2 are denoted by the same reference numerals as those used to denote the respective constituent elements shown in FIG. 2, and will not be described appropriately. In FIG. 5, an arrow X indicates an axial direction and an arrow Y indicates a crossing direction. In FIG. 5, the constituent elements of the fuel cell module are cutaway or omitted appropriately to be able to easily understand an internal structure of the fuel cell module. In the following description, the tubular FC cell 10A is often referred simply as "cell 10A".

As shown in FIG. 5, a fuel cell module 100 according to the present invention comprises a plurality of fuel cell assemblies 72, 72, . . . , each configured to include the cells 10A, 10A, . . . , the first current collector 35, and the second current cell collectors 41, 41, . . . . Furthermore, a gas distribution channel 60 in which the air supplied to outer circumferential surfaces (cathodes) of the respective cells 10A, 10A, . . . is to flow is divided almost completely from anode manifolds 61 and 62 in which hydrogen supplied to hollow portions (anodes) of the respective cells 10A, 10A, . . . is to flow via seal members 80, 80 and a seal material 81. Although not shown in FIG. 5, the seal material 81 is also provided on the anode manifold 62 side in the same manner as the seal material 81 shown in FIG. 5. In the fuel cell module 100 shown therein, charges generated in cathode catalyst layers of the respective cells 10A, 10A, . . . are collected via the first current collector 35 and the second current collectors 41. Further, the charges thus collected are extracted to the outside via a cathode current collector 53 connected to the second current collectors 41, 41, . . . and a cathode output unit 54 connected to the cathode current collector 53. Further, charges generated in anode catalyst layers of the respective cells 10A, 10A, . . . are collected into an anode current collector 51 via anode current collectors (not shown) provided in the respective cells 10A, 10A, . . . , and extracted to the outside via an anode output unit 52 connected to the anode current collector 51.

As can be understood, the fuel cell module 100 according to the present invention comprises a plurality of fuel cell assemblies 72, 72, . . . configured as stated above. Due to this, by improving current collection efficiencies of the fuel cell assemblies 72, 72, . . . , the current collection efficiency of the fuel cell module 100 can be improved.

For the sake of convenience, the fuel cell module 100 configured to comprise the fuel cell assemblies 72, 72, . . . according to the second embodiment has been described. However, the configuration of the fuel cell module according to the present invention is not limited to that described above. The fuel cell module according to the present invention may be configured to comprise the fuel cell assemblies 71 according to the first embodiment or the fuel cell assemblies 70 according to the third embodiment. If the fuel cell module according to the present invention comprises the fuel cell assemblies 70 according to the third embodiment, the fuel cell module may be configured, for example, so that the tab 30A of each of the third current collectors comprised in each of the fuel cell assemblies 70 is connected to the cathode current collector 53. If the fuel cell module according to the present invention comprises the fuel cell assemblies 71 according to the first embodiment, the fuel cell module may be configured, for example, so that the second current collector 40 is connected to the cathode current collector 53.

On the other hand, while the fuel cell module 100 is actuated, the cells 10A generate heat. If Nafion, for example, is used as the electrolyte membrane of the cell 10A, it is necessary to keep a temperature of the cell 10A to about 80° C. to 100° C. so that the Nafion expresses a good proton-conducting property. It is, therefore, necessary to cool the cells 10A by appropriate means. Besides, with a view of, for example, facilitating handling the fuel cell comprising the fuel cell module, it is preferable to effectively cool the cells 10A. According to the present invention, a method of cooling the cells 10A is not limited to a specific one. Specific examples of the cooling method include water cooling and air cooling. If the cells 10A are subjected to water cooling, a manner of the water cooling is not limited to a specific one. However, it is preferable that the fuel cell module comprises cooling tubes at a certain ratio (e.g., the total number ratio of the cooling tubes to the cells 10A of 1 to 3) with a view of, for example, effectively cooling the cells 10A without using large-scale equipment. By so configuring the fuel cell module, if water is circulated through the cooling tubes, the cells 10A comprised in the fuel cell module can be effectively cooled. In FIG. 5, constituent elements for circulating the cooling water are not shown.

Figure 6:
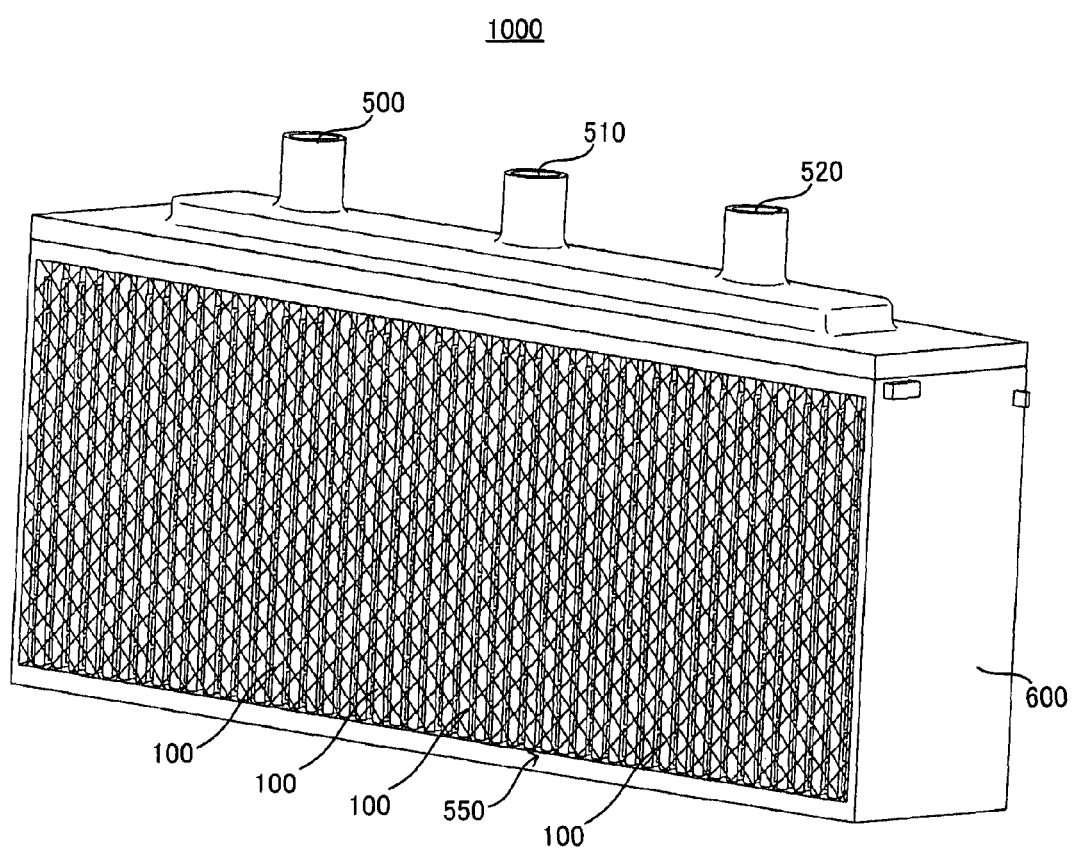
FIG. 6 is an external view schematically showing an example of a configuration of a fuel cell comprising the fuel cell modules according to the present invention.
Figure 7:
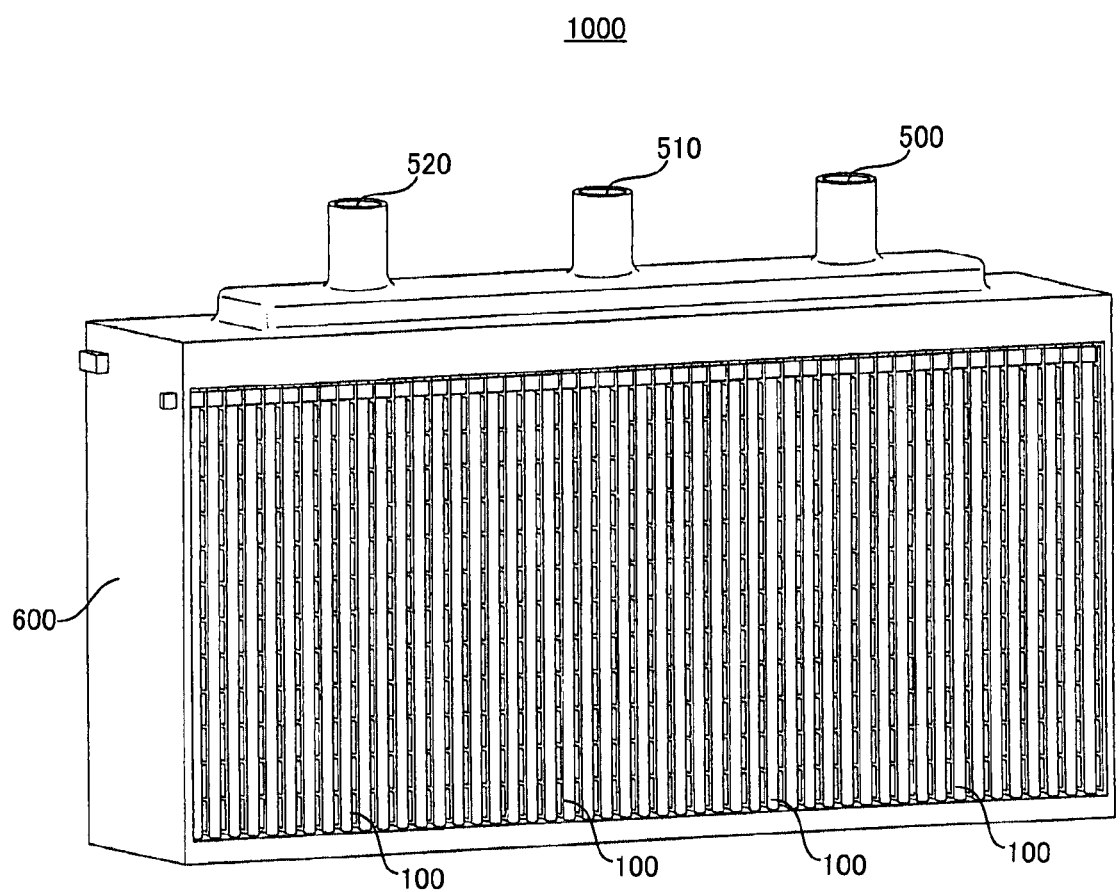
FIG. 7 is an external view schematically showing an example of a configuration of a fuel cell comprising the fuel cell modules according to the present invention.

FIGS. 6 and 7 are external views schematically showing an example of a configuration of a fuel cell comprising the fuel cell module according to the present invention. FIG. 7 is a back view of the fuel cell shown in FIG. 6, and lattice members respectively provided on side surfaces are not shown in FIG. 7 so as to be able to easily understand an internal structure of the fuel cell. Referring to FIGS. 6 and 7, the fuel cell module according to the present invention will be described.

As shown in FIGS. 6 and 7, a fuel cell 1000 according to the present invention is configured by containing a plurality of fuel cell modules 100, 100, . . . in an external container 600. A reaction gas (e.g., hydrogen) introduction port 500, a reaction gas discharge port 510, and a cooling water port 520 are provided on an upper surface of the external container 600. Lattice members 550 are provided on a pair of side surfaces of the external container 600, respectively. If a gas supplied to the reaction gas introduction port 500 is hydrogen, the air is supplied to the fuel cell 1000 in a direction of penetrating the lattice members 550. The air supplied to one of the lattice members 550 shown in FIG. 6 is discharged from a lattice member (not shown in FIG. 7) to be provided on a back surface of the external container 600. A temperature of each of the fuel cell modules 100, 100, . . . that generate heat when the fuel cell 1000 thus configured is actuated is controlled by a method of, for example, causing water supplied and discharged from the cooling water port 520 to be circulated through cooling tubes comprised in the respective fuel cell modules 100, 100, . . . .

As can be understood, the fuel cell 1000 according to the present invention comprises a plurality of fuel cell modules 100, 100, . . . . Due to this, by improving current collection efficiencies of the respective fuel cell modules 100, the current collection efficiency of the fuel cell 1000 can be improved.

Materials for forming the constituent elements of the fuel cell module and the tubular FC cell included in the fuel cell and configurations thereof will be described below.

In the tubular FC cell according to the present invention, materials for forming the electrolyte membrane, the anode catalyst layer, the cathode catalyst layer, the anode current collector, and the cathode current collector are not limited to specific ones as long as they can produce electric energy by the electrochemical reaction.

Specific examples of the material for forming the electrolyte membrane of the tubular FC cell according to the present invention (hereinafter, referred to as "electrolyte material") can include the fluorine-based ion exchange resin membrane, an organic electrolyte component such as a hydrocarbon resin typified by an amidic resin, and an inorganic electrolyte component mainly containing a silicon oxide or the like. To form the electrolyte membrane easily, it is particularly preferable that the electrolyte material is the inorganic electrolyte component which mainly contains a silicon oxide. If the inorganic electrolyte component is used as the electrolyte material according to the present invention, specific examples of the electrolyte component can include a tubular electrolyte membrane obtained by forming porous glass into a tube, reforming inside surfaces of nano pores, and imparting a proton-conducting property to the tube, and a tubular phosphate glass-applied membrane.

The material of the anode catalyst layer and the cathode catalyst layer (hereinafter, referred to as simply "catalyst layers") according to the present invention is not limited to a specific one as long as the material contains a matter that functions as a catalyst for an electrochemical reaction (e.g., platinum-supported carbon in which platinum particles are supported by carbon particles, hereinafter, "catalyst matter"). For example, the material of the catalyst layers may contain the catalyst matter and a proton-conducting matter that enhances utilization efficiency of the catalyst matter. Specific examples of the proton-conducting matter that can be contained in the catalyst layers according to the present invention can include the above perfluorocarbon sulfonate polymer. Furthermore, specific examples of the catalyst matter according to the present invention can include a matter in which a catalyst component is supported by a conductive material such as a carbon material, e.g., carbonaceous particles or carbonaceous fibers.

With the fuel cell comprising the tubular FC cell according to the present invention, an electrode area per unit volume can be made larger than that of the flat FC. Therefore, even if a catalyst component has a smaller catalytic activity than platinum suitably used as the catalyst component of the flat FC is used, it is possible to obtain a fuel cell having a high output density per unit volume. Due to this, the catalyst component according to the present invention is not limited to a specific one as long as the component has a catalytic activity in a hydrogen oxidation reaction at an anode and an oxygen reduction reaction at a cathode. Specific examples of the catalyst component can include a single metal such as Pt, Ru, Ir, Rh, Pd, Os, W, Pb, Fe, Cr, Co, Ni, Mn, V, Mo, Ga and Al, and an alloy containing one of these metal elements. To improve the output density per unit volume, it is preferable to use platinum and/or a platinum alloy as the catalyst component.

Moreover, the form of the anode current collector according to the present invention is not limited to a specific one. Specific examples of the form of the anode current collector can include a spring form, a form in which many holes penetrating a wall surface of a tube are formed in the wall surface thereof, a form in which the wall surface of the tube is a mesh surface, and a form in which a plurality of linear conductors is arranged in an axial direction of an outer circumferential surface of a hollow MEA. To improve the current collection efficiency, the anode current collector is preferably a spring current collector.

For the sake of convenience, the tubular FC cell that does not comprise a diffusion layer has been described. However, the configuration of the tubular FC according to the present invention is not limited to that described above. The tubular FC according to the present invention may include a diffusion layer between the MEA and the current collector.

Moreover, the configuration in which hydrogen is supplied to the inside of the tubular FC cell and the air is supplied to the outside thereof has been described. However, the present invention is not limited to the configuration. The air (oxygen-based gas) and the hydrogen (hydrogen-based gas) may be supplied to the inside and the outside of the tubular FC cell, respectively.

INDUSTRIAL APPLICABILITY

As stated so far, the fuel cell module and the fuel cell comprising the fuel cell modules according to the present invention are suitably employed as a power source of a battery car or a portable power supply.

The invention claimed is:

1. A fuel cell module comprising:
a plurality of tubular fuel cells arranged in parallel;
a first current collector;
a second current collector arranged in parallel to the plurality of tubular fuel cells; and
a third current collector in contact with the first current collector,
wherein:
the plurality of tubular fuel cells and the second current collector are woven by the first current collector in a direction crossing an axial direction of the tubular fuel cells in a plan view so that the plurality of tubular fuel cells and the second current collector are integrally fixed by the first current collector,
the first current collector passes repeatedly back and forth between one tubular fuel cell arranged on a first end of the plurality of tubular fuel cells arranged in parallel and another tubular fuel cell arranged on a second end of the plurality of tubular fuel cells arranged in parallel contacting an outer surface of each of the plurality of tubular fuel cells and contacting an outer surface of the second current collector, and
the third current collector is a gridiron flat plate or a lattice flat plate.

2. The fuel cell module according to claim 1, wherein the second current collector is arranged on an end of an array of the plurality of tubular fuel cells.

3. The fuel cell module according to claim 1, wherein the second current collector is arranged in parallel to and alternately with the plurality of tubular fuel cells.

4. The fuel cell module according to claim 1, wherein the first current collector is gas-permeable.

* * * * *